(12) United States Patent
Burkett et al.

(10) Patent No.: US 11,476,059 B2
(45) Date of Patent: Oct. 18, 2022

(54) ISOLATING SWITCH WITH TEST POINT

(71) Applicant: Eaton Intelligent Power Limited, Dublin (IE)

(72) Inventors: Roger Burkett, Swindon (GB); Maite Castro, Birmingham (GB)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/044,403

(22) PCT Filed: Mar. 19, 2019

(86) PCT No.: PCT/EP2019/056748
§ 371 (c)(1),
(2) Date: Oct. 1, 2020

(87) PCT Pub. No.: WO2019/192831
PCT Pub. Date: Oct. 10, 2019

(65) Prior Publication Data
US 2021/0118629 A1   Apr. 22, 2021

(30) Foreign Application Priority Data

Apr. 3, 2018 (GB) ..................... 1805432

(51) Int. Cl.
*B60L 50/60* (2019.01)
*H01H 1/58* (2006.01)
(Continued)

(52) U.S. Cl.
CPC ............... *H01H 1/58* (2013.01); *B60L 50/60* (2019.02); *H01H 9/02* (2013.01); *H01H 3/38* (2013.01);
(Continued)

(58) Field of Classification Search
USPC ......................................................... 307/9.1
See application file for complete search history.

(56) References Cited

U.S. PATENT DOCUMENTS

2008/0125201 A1* 5/2008 Kim .................... H04M 1/0237
455/575.4
2010/0081316 A1   4/2010 Eppe et al.
(Continued)

FOREIGN PATENT DOCUMENTS

DE        29721446 U1      4/1998
DE     102015118095   *    1/2017
(Continued)

Primary Examiner — Rexford N Barnie
Assistant Examiner — Xuan Ly
(74) Attorney, Agent, or Firm — Leydig, Voit & Mayer, Ltd.

(57) ABSTRACT

An isolating switch for a circuit includes: a switching mechanism movable between an open position in which the circuit is open and a closed position in which the circuit is closed; and a housing. The housing includes: a first housing component coupled to and enclosing the switching mechanism; a second housing component coupled to the switching mechanism and movable with respect to the first housing component to move the switching mechanism between the open position and the closed position; at least one aperture arranged in one of the first or second housing components; and at least one test point electrically connected to the circuit and arranged in an other of the first or second housing components. The second housing component is movable with respect to the first housing component between at least: a first relative position in which the switching mechanism is in the closed position.

15 Claims, 8 Drawing Sheets

(51) Int. Cl.
*H01H 9/02* (2006.01)
*H01H 3/38* (2006.01)
*H01H 3/42* (2006.01)
*H01H 9/20* (2006.01)

(52) U.S. Cl.
CPC .............. *H01H 3/42* (2013.01); *H01H 9/20* (2013.01); *H01H 2009/0292* (2013.01)

(56) References Cited

U.S. PATENT DOCUMENTS

2014/0166450 A1   6/2014  Buettner et al.
2014/0253146 A1*  9/2014  Kesler .................... G01R 1/206
                                                      324/555
2017/0273540 A1*  9/2017  Yoshinaga ............... A61B 1/00
2017/0330720 A1* 11/2017  Shea ...................... H01H 9/443

FOREIGN PATENT DOCUMENTS

DE        102015118095 A1    1/2017
FR             2269809 A1   11/1975
WO          2013155545 A1   10/2013
WO        WO2013155545    * 10/2013

* cited by examiner

ISOLATING SWITCH WITH TEST POINT

CROSS-REFERENCE TO PRIOR APPLICATIONS

This application is a U.S. National Phase application under 35 U.S.C. § 371 of International Application No. PCT/EP2019/056748, filed on Mar. 19, 2019, and claims benefit to British Patent Application No. GB 1805432.0, filed on Apr. 3, 2018. The International Application was published in English on Oct. 10, 2019 as WO/2019/192831 under PCT Article 21(2).

FIELD

This relates to an isolating switch with a test point, a powertrain for an electric vehicle comprising the isolating switch, and an electric vehicle comprising the isolating switch.

BACKGROUND

Electric vehicles such as electric cars can comprise high voltage circuits which connect the high-voltage components of the electric powertrain of the vehicle in order to operate the electric vehicle (for example, the high voltage circuit which connects the individual cells of an electric vehicle battery). However, such high voltage circuits must be broken in order to isolate the components they run through for servicing or testing. For example, the electrical output of an electric vehicle battery must be isolated by breaking the high voltage circuit which connects the battery cells within the battery in order to service or test the battery.

Known products for isolating the battery (sometimes referred to as manual service disconnect products) can be large and heavy, as the products both carry and break the high voltage circuit. Such isolation mechanisms can therefore require large and heavy conductors, due to the high voltages and currents involved. For such applications, it is therefore desirable to provide a product for breaking the high voltage circuit within the battery system which can be smaller and lighter than traditional products. It is also desirable to provide a product which facilitates isolation of the battery in a simple and intuitive manner, whilst ensuring the safety of the user.

Such a product which facilitates isolation of electrical components in an electrical circuit in a simple and intuitive manner is also desirable in any application where one or more components need to be isolated from an electric circuit in order to safely service and/or test said components.

US 2014/253146 A1 discloses a test switch which includes a switch lever, a test port configured to directly couple to a standard connector, a relay port, a field port, and an insulated frame configured to electrically insulate at least some electrically conductive portions of the test port, the relay connector, and the field connector from contact by a user. A user may actuate the switch lever in order to reconfigure the electrical test switch from a first configuration to a second configuration. In the first configuration, the test port contact is electrically isolated from the relay connector and the field connector is electrically connected to the relay connector. In the second configuration, the test port contact is electrically connected to the relay connector and the relay connector is electrically isolated from the field connector.

SUMMARY

In an embodiment, the present invention provides an isolating switch for a circuit, comprising: a switching mechanism movable between an open position in which the circuit is open and a closed position in which the circuit is closed; and a housing, comprising: a first housing component coupled to and enclosing the switching mechanism; a second housing component coupled to the switching mechanism and movable with respect to the first housing component to move the switching mechanism between the open position and the closed position; at least one aperture arranged in one of the first or second housing components; and at least one test point electrically connected to the circuit and arranged in an other of the first or second housing components, wherein the second housing component is movable with respect to the first housing component between at least: a first relative position in which the switching mechanism is in the closed position and the at least one test point is not exposed through the at least one aperture, a second relative position in which the switching mechanism is in the open position and the at least one test point is not exposed through the at least one aperture, and a third relative position in which the switching mechanism is in either the closed position or the open position and the at least one test point is exposed through the at least one aperture.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1A:
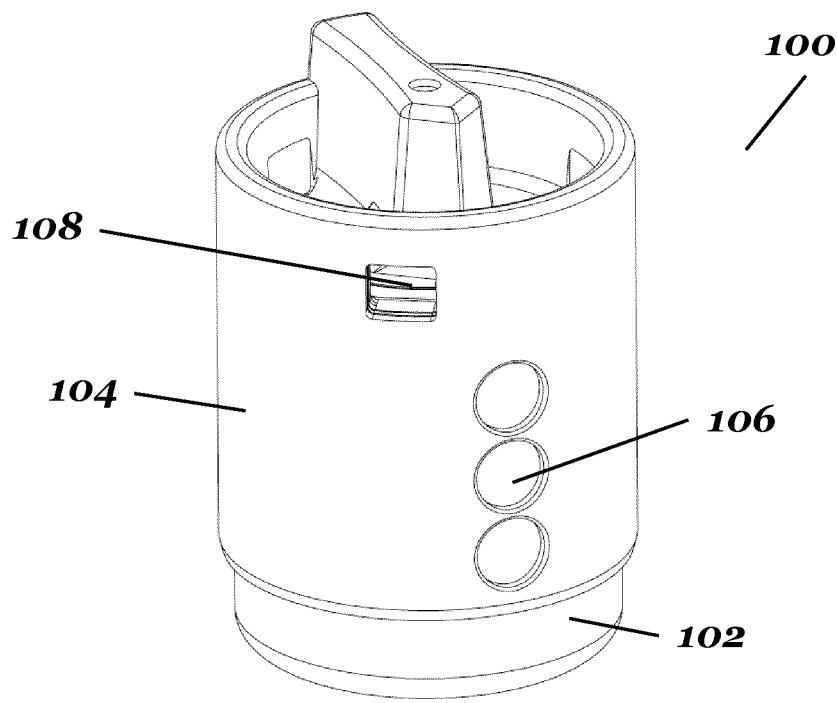
FIGS. 1A and 1B are isometric views of different embodiments of an isolating switch.

In a first aspect, an apparatus is provided as described herein, with optional features defined as described herein. In a second aspect, a method comprising operating the apparatus of the first aspect is provided. An electric powertrain comprising the apparatus of the first aspect and an electric vehicle comprising the apparatus of the first aspect are also provided.

In the following description, an isolating switch for a circuit is described. The isolating switch comprises: a switching mechanism movable between an open position in which the circuit is open and a closed position in which the circuit is closed; and a housing. The housing comprises: a first housing component coupled to and enclosing the switching mechanism; a second housing component coupled to the switching mechanism and movable with respect to the first housing component to move the switching mechanism between the open position and the closed position; at least one aperture; and at least one test point electrically connected to the circuit. The second housing component is movable with respect to the first housing component between at least: a first relative position in which the switching mechanism is in the closed position and the at least one test point is not exposed; a second relative position in which the switching mechanism is in the open position and the at least one test point is not exposed; and a third relative position in which the switching mechanism is in either the closed or the open position and the at least one test point is exposed through the at least one aperture.

This switching architecture can advantageously facilitate disconnection of a voltage within a circuit system (i.e. breaking of the circuit) in a simple manner. In particular, by providing a second housing component which is movable between three relative positions with respect to a first housing component, electrical isolation of components forming part of the circuit can be achieved in an intuitive manner. This arrangement can also provide for testing of the components through the at least one test point, whilst preventing access to the test point(s) when the isolating switch is in a non-testing configuration, which can facilitate an increase in user safety. Moreover, the above arrangement can facilitate location of the isolating switch in a location remote from other components connected to the circuit, which can provide ease of access to an end-user or service person.

In applications such as electric vehicles, the isolating switch can also be smaller and lighter than traditional manual service disconnect products, since the isolating switch can be used to switch a high voltage interlock loop (HVIL), a low-voltage circuit which runs through the high voltage components of the electric vehicle, rather than the high voltage circuit of the electrical system itself. If the HVIL is broken, all the high-voltage components the HVIL runs through will be isolated from their associated high voltage circuits and discharged, without requiring physical switching of the high voltage circuit. For example, breaking of the HVIL may trigger a shut-off program to shut down the high voltage circuit. Alternatively, a relay mechanism may be used. The HVIL is a much lower voltage circuit than the high voltage circuit which powers the battery, and therefore the isolating switch used to break the circuit can utilise smaller conductors than would be needed with known products, which traditionally are arranged to carry and switch the high voltage circuit. Alternatively, the isolating switch could be arranged to switch the high voltage circuit itself.

Advantageously, the at least one aperture is arranged in one of the first or second housing components of the housing. Optionally, the at least one test point is then arranged in the other of the first or second housing components of the housing, i.e. the housing component which does not comprise the at least one aperture. In some embodiments, the at least one aperture is arranged in the second housing component and the at least one test point is arranged in the first housing component. In other embodiments, the at least one aperture is arranged in the first housing component and the at least one test point is arranged in the second housing component. In these arrangements, the at least one test point can be exposed and accessed via an overlap of the at least one aperture with the at least one test point. This architecture can facilitate the provision of a smaller and more compact isolating switch, since it can enable the first and second housing component to be nested (or otherwise located one inside the other).

Optionally, the second housing component is movable with respect to the first housing component between four relative positions, wherein in the third relative position the switching mechanism is in the open position and the at least one test point is exposed through the at least one aperture and in a fourth relative position the switching mechanism is in the closed position and the at least one test point is exposed through the at least one aperture. This arrangement can facilitate a broad range of circuit connections via movement of the switching mechanism, and can enable servicing and/or testing of the circuit and its associated components in both an open and closed arrangement (i.e. when the components are either live or not live, or dead). As used herein, "live" refers to electrically live.

Optionally, the at least one test point exposed in the third relative position is the same at least one test point as that exposed in the fourth relative position. Since fewer electrical components may be required in order for the isolating switch to operate effectively, this can facilitate the provision of an isolating switch which is simpler, and requires less material, to manufacture. Alternatively, the at least one test point exposed in the third relative position is a different at least one test point to that exposed in the fourth relative position. This can facilitate a broader range of geometries of the isolating switch housing, which can allow the isolating switch to be used in a greater range of applications.

In a first group of embodiments, the second housing component is rotatable with respect to the first housing component. Optionally, the switching mechanism comprises a rotary switch, optionally a rotary cam switch. A rotational isolating switch arrangement can facilitate the provision of a more compact isolating switch, since the second housing component can rotate relative to the first housing component without requiring additional space around the isolating switch. As such, a rotational isolating switch arrangement may be beneficial in applications where space is particularly limited.

In a second group of embodiments, the second housing component is movable in a linear direction with respect to the first housing component, i.e. the second housing component can be translated with respect to the first housing component. Optionally, the switching mechanism comprises a rotary switch arranged to convert translational movement of the second housing component into rotational movement of the switching mechanism. Alternatively, the switching mechanism comprises a linear switch. Such a linear isolating switch arrangement can facilitate the provision of a greater range of isolating switch housing geometries, which can provide for a greater range of applications said isolating switch. Moreover, the switching mechanism can be smaller than in some rotational applications, which can provide for a smaller housing overall.

Optionally, the first and second housing components each comprise at least one opening arranged such that, when the switching mechanism is in the open position, an opening of the first housing component and an opening of the second housing component overlap. Optionally, the openings are for receiving a shackle or pin of a locking mechanism. The ability to use or apply a locking mechanism to the isolating switch when the switch is in the open position can improve the safety of an end-user or service person. In particular, the openings can facilitate locking off the isolating switch when the switching mechanism is in one, or both, of the open positions (i.e. when the circuit is broken and the components are electrically isolated); this can improve user safety whilst the components are being serviced. Additionally or alternatively, the openings may be arranged such that they overlap when the switching mechanism is in one or both of the closed positions.

Optionally, the isolating switch is for a high voltage interlock loop (HVIL) circuit of an electric vehicle. Optionally, there is provided an electric vehicle comprising said isolating switch. In some arrangements, there is provided an electric vehicle comprising an isolating switch of any of the above described arrangements, the electric vehicle further comprising an HVIL circuit; and a battery pack connected to the FIVIL circuit, wherein when the second housing component is in the first or the fourth relative positions, the battery pack is live, and when the second housing component is in the second or the third relative positions, the battery pack is not live.

The isolating switch can be advantageous in such an application, since it can facilitate a simple and intuitive isolation of the electric vehicle battery for sensing and/or testing. The isolating switch can also be located remotely from the battery pack for ease of access. The above described isolating switch can also be smaller in size and lighter in weight than traditional manual service disconnect products for the servicing of batteries of electric vehicles, which switch the high voltage circuit that powers the battery, since the isolating switch can be applied to the low-voltage FIVIL circuit associated with the battery (i.e. smaller components are needed due to the lower voltages involved).

Optionally, there is provided a powertrain for an electric vehicle comprising an isolating switch of any of the above described arrangements. Optionally, there is provided an electric vehicle comprising said powertrain.

Figure 1B:
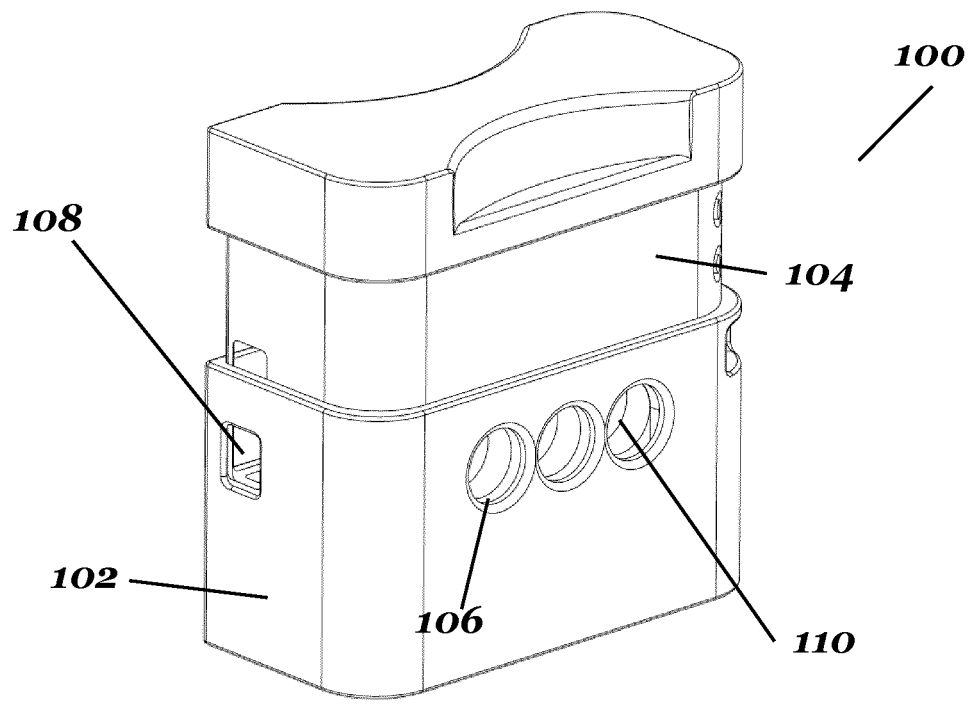

With reference to FIGS. 1A and 1B, embodiments of a housing of an isolating switch 100 are described. Switch 100 comprises a housing, said housing comprising first housing component 102 and second housing component 104. Second housing component 104 is movable with respect to the first housing component 102. With reference to FIG. 1A, said movement can be rotational. With reference to FIG. 1B, said movement can be linear, or translational. Alternatively, any other suitable movement of the second housing component relative to the first housing component can be employed in order to operate the isolating switch 100, which operation will be described below.

Figure 2A:
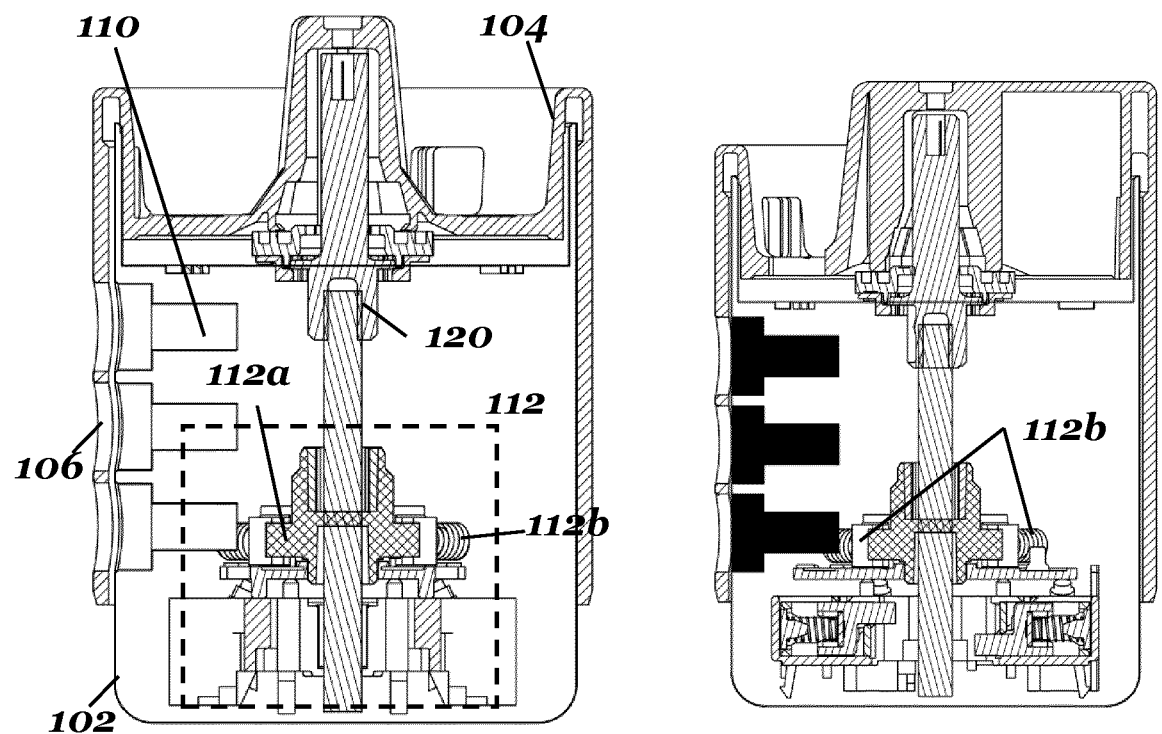
FIGS. 2A and 2B illustrate embodiments of a switching mechanism of the isolating switch of FIGS. 1A and 1B.
Figure 2B:
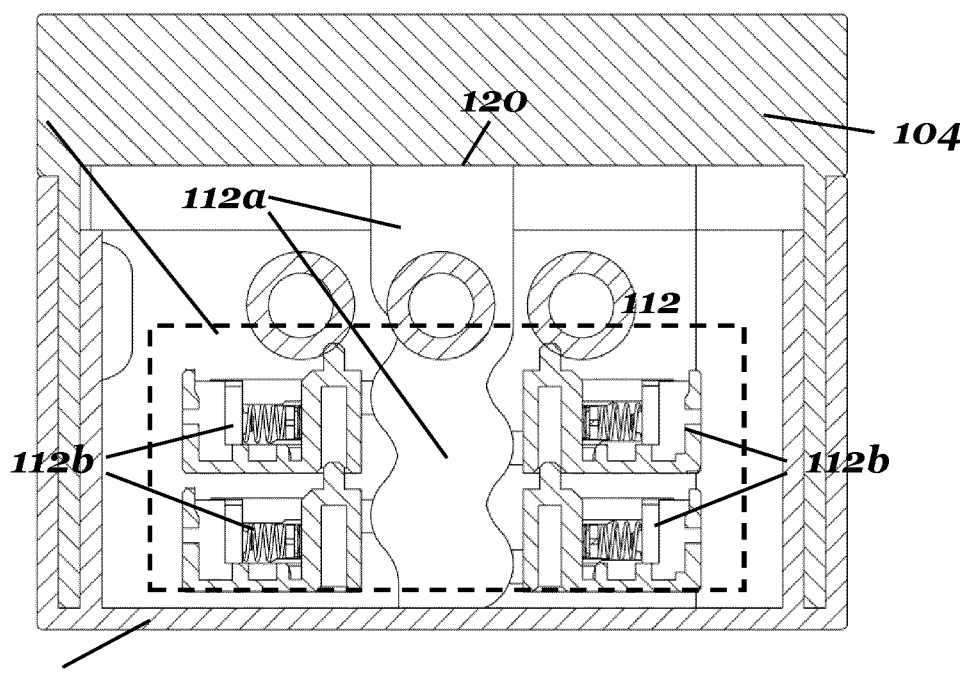

The isolating switch 100 also comprises a switching mechanism 112 (shown in FIGS. 2A and 2B within the dashed box). In particular, the first housing component 102 is coupled to and encloses the switching mechanism. The switching mechanism is movable between an open position in which a circuit 118 (shown in FIG. 2C) to which the switching mechanism is connected is open, and a closed position in which the circuit 118 is closed. Operation of the switching mechanism is facilitated by movement of the second housing component 104 relative to the first housing component 102. This arrangement will be described in more detail below with reference to FIGS. 2A to 2C.

The housing of the isolating switch 100 further comprises at least one aperture 106. The at least one aperture is shown in FIGS. 1A and 1B as three separate apertures, but it will be understood that a single aperture, two apertures, or more than three apertures may be provided as appropriate. The at least one aperture is advantageously provided in one of the first or second housing components 102, 104. As can be seen from FIG. 1A, the at least one aperture 106 can be provided in the second housing component 104. Alternatively, as can be seen from FIG. 1B, the at least one aperture 106 can be provided in the first housing component 102.

The housing of the isolating switch 100 further comprises at least one test point 110. The at least one aperture 106 is advantageously arranged such that, in some relative positions of the first and second housing components 102, 104, the at least one test point 110 of the housing is exposed. In order to facilitate this arrangement, the at least one aperture 106 can be arranged in one of the first 102 or second 104 housing components, and the at least one test point 110 can be arranged in the other of the first or second housing components 102, 104. The at least one test point 110 allows application of one or more external electrical devices, such as a multi-meter, to components connected to circuit 118 to facilitate testing of said components.

The housing optionally further comprises means for locking the isolating switch. The means for locking can be any means suitable for preventing or obstructing movement of the second housing component relative to the first housing component. For example, the locking means can be a physical locking mechanism, a click fit mechanism, protrusions and/or openings on the first and/or second housing components which facilitate locking of the isolating switch, or any other suitable mechanism. The use of a locking means can facilitate the safer servicing of components electrically connected to a circuit by way of the switching mechanism of the isolating switch by helping to prevent the isolating switch from being operated during servicing by a user.

The means for locking can optionally comprise one or more openings arranged to receive a lock. In the first and second groups of embodiments described herein, the first and second housing components 102, 104 each comprise at least one opening 108 arranged to receive a shackle or pin of a locking mechanism. In some (or all) relative positions of the first and second housing components, the openings 108 overlap. The openings thus facilitate use of a locking mechanism in order to lock the isolating switch 100 when the second housing component 104 is in one or more specific positions with respect to the first housing component 102. For example, a lock can be passed through the openings 108 when the at least one test point 110 is exposed, as shown in FIG. 1B, in order that the second housing component 104 cannot be moved relative to the first housing component 102. This arrangement can facilitate safer servicing of components to which the isolating switch is operatively coupled.

Figure 2C:
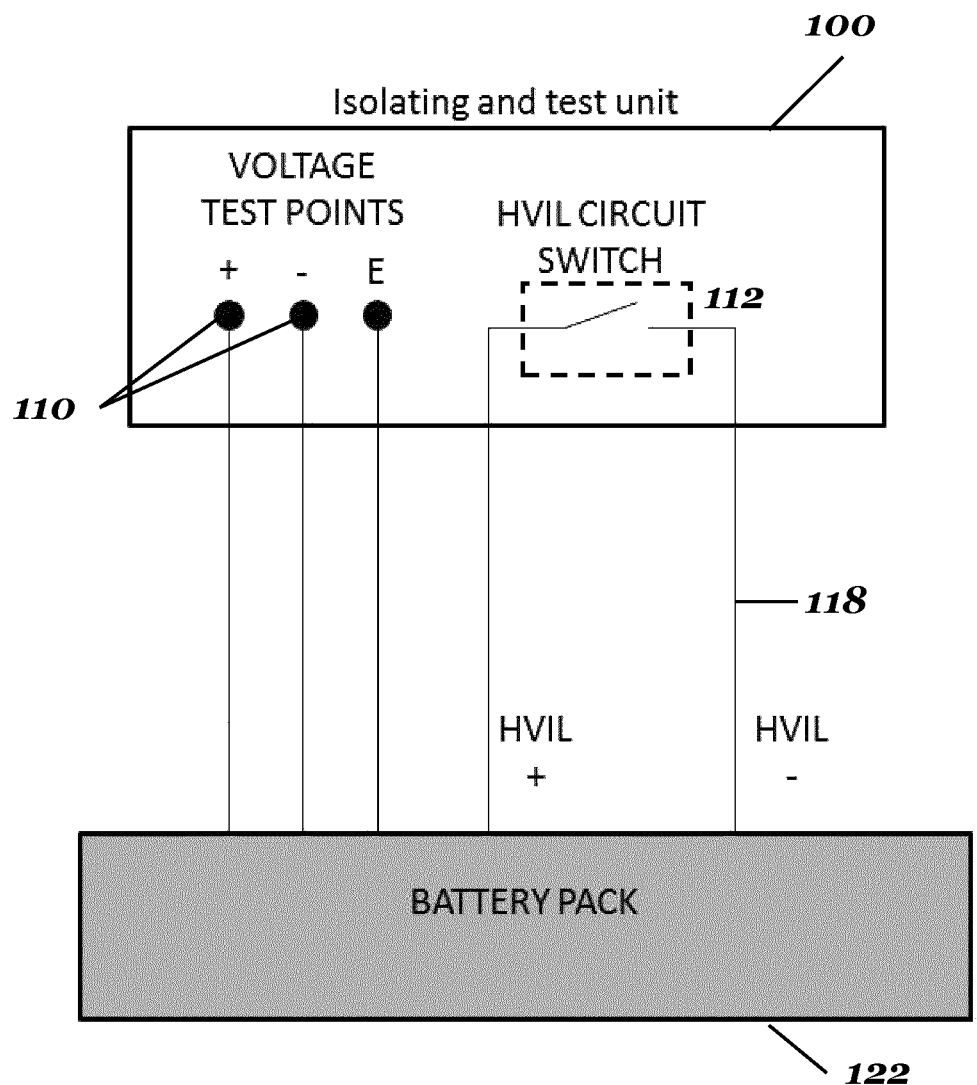
FIG. 2C shows a schematic circuit diagram for application of an isolating switch to an FIVIL circuit.

With reference to FIGS. 2A and 2B, the switching mechanism 112 of the isolating switch 100 is described. FIG. 2A describes the switching arrangement when the second housing 104 is movable in a rotational manner with respect to the first housing component 102 (first group of embodiments), and FIG. 2B describes the switching arrangement when the second housing component 104 is movable in a linear direction with respect to the first housing component 102 (second group of embodiments). FIG. 2C illustrates the arrangement of the isolating switch 100 (in particular the at least one test point 110 and switching mechanism 112) with respect to circuit 118.

Switching mechanism 112 in FIG. 2A is a rotary cam mechanism, but any other suitable rotary or linear switching mechanism can be used. First housing component 102 encloses and is coupled to the switching mechanism 112. Second housing component 104 is coupled to switching mechanism 112 at a coupling point 120, such that rotation of the second housing component 104 relative to the first housing component 102 moves the switching mechanism 112 between an open position in which the circuit 118 is open and a closed position in which the circuit 118 is closed. In particular, rotation of second housing component 104 causes rotation of cam member 112a relative to resilient members 112b. Cam member 112a is arranged such that, in some positions, the cam member 112a exerts a force on the resilient members 112b in order to close the circuit, and in other positions no force is exerted on the resilient members 112b by cam member 112a and the circuit is open.

In other words, rotation of the second housing component 104 relative to the first housing component 102 causes circuit 118 to be opened and closed by way of switching mechanism 112. Second housing component 104 is movable between four positions relative to first housing component 102 in the embodiment shown in FIG. 2A and, as such, cam member 112a is also movable between four positions due to the coupling between the cam member 112a and the second housing component 104. Such coupling may be direct or indirect. However, due to the offset positions of resilient members 112b and the geometry of cam member 112a, the overall switching mechanism 112 is movable only between two positions—an open position in which circuit 118 is open, and a closed position in which circuit 118 is closed.

Switching mechanism 112 in FIG. 2B is a linear switch mechanism, but any other suitable rotary or linear switching mechanism can be used. First housing component 102 encloses and is coupled to the switching mechanism 112. Second housing component 104 is coupled to switching mechanism 112 at a coupling point 120 such that translation of the second housing component 104 relative to the first housing component 102 moves member 112a relative to resilient members 112b to open and close circuit 118. In particular, the geometry of member 112a provides two different positions for switching mechanism 112—a closed position in which member 112a exerts a force on resilient members 112b in order to close circuit 118, and an open position in which no force is exerted on resilient members 112b by member 112a and circuit 118 is open.

Second housing component 104 is movable between four positions relative to first housing component 102 in FIG. 2B and, as such, member 112a is also movable between four positions due to the coupling between the member 112a and the second housing component 104. Such coupling may be direct or indirect. The geometry of member 112a of switching mechanism 112 however provides for the overall switching mechanism 112 to be movable only between the open and the closed positions.

With reference to FIG. 2C, the position and operation of the isolating switch 100 is described. The isolating switch 100 allows components connected to circuit 118 to be isolated for servicing. In arrangements where circuit 118 is a high voltage interlock loop (HVIL) circuit, which runs through components of an electric vehicle such as battery pack 122, switching the HVIL indirectly isolates the battery 122. In addition, operation of the isolating switch 100 can expose one or more test points 110, which test point(s) are electrically connected to said components, for use in said servicing.

When switching mechanism 112 (shown within the dashed box) of isolating switch 100 is in the open position, the HVIL circuit is open and the battery 122 is off, or not live. When switching mechanism 112 is in the closed position, the HVIL circuit is closed and the battery 122 is live.

At least three, and advantageously four, arrangements of the second housing component 104 relative to the first housing component 102 are envisaged in order to facilitate normal operation of the circuit 118 and testing of component(s) electrically connected to said circuit. In a first relative position, switching mechanism 112 is in the closed position such that circuit 118 is closed and battery 122 is live, and the at least one test point 110 is not exposed. In a second relative position, switching mechanism 112 is in the open position such that circuit 118 is open and battery 122 is not live, and the at least one test point 110 is not exposed. In a third relative position, the at least one test point 110 is exposed and the switching mechanism 112 is in either the open or the closed position. This can facilitate testing of the battery 122 in a simple and effective manner.

When four arrangements of the second housing component relative to the first housing component are provided, in the third relative position the at least one test point 110 is exposed and the switching mechanism 112 is in the open position. In a fourth relative position, switching mechanism 112 is in the closed position and the at least one test point 110 is exposed. Exposure of the at least one test point 110 when the circuit 118 is in both the open and the closed positions can provide the ability to service and/or test the components connected to circuit 118, such as battery 122, through the at least one test point 110 in a flexible manner. In particular, this arrangement can provide a user with a safer servicing facility, since the components electrically connected to circuit 118 can be quickly and easily isolated, and then tested in a simple manner through the exposed test point(s). Moreover, provision of the first and second relative positions, in which the at least one test point is not exposed, can facilitate the safe isolation of components such as battery 122 from the circuit 118, since the user is not exposed to live terminals during said isolation procedure.

The four relative positions of the second housing component 104 relative to the first housing component 102 are described below in more detail with reference to FIGS. 3A to 3D and 4A to 4D. In particular, FIGS. 3A to 3D describe these four relative positions with respect to the first group of, rotational, embodiments, and FIGS. 4A to 4D describe these four positions with respect to the second group of, translational (or linear), embodiments. In each of these Figures, the left drawing is a perspective view of the isolating switch 100 and the right drawing is a top (first group of embodiments) or side (second group of embodiments) view of the isolating switch 100.

Figure 3A:
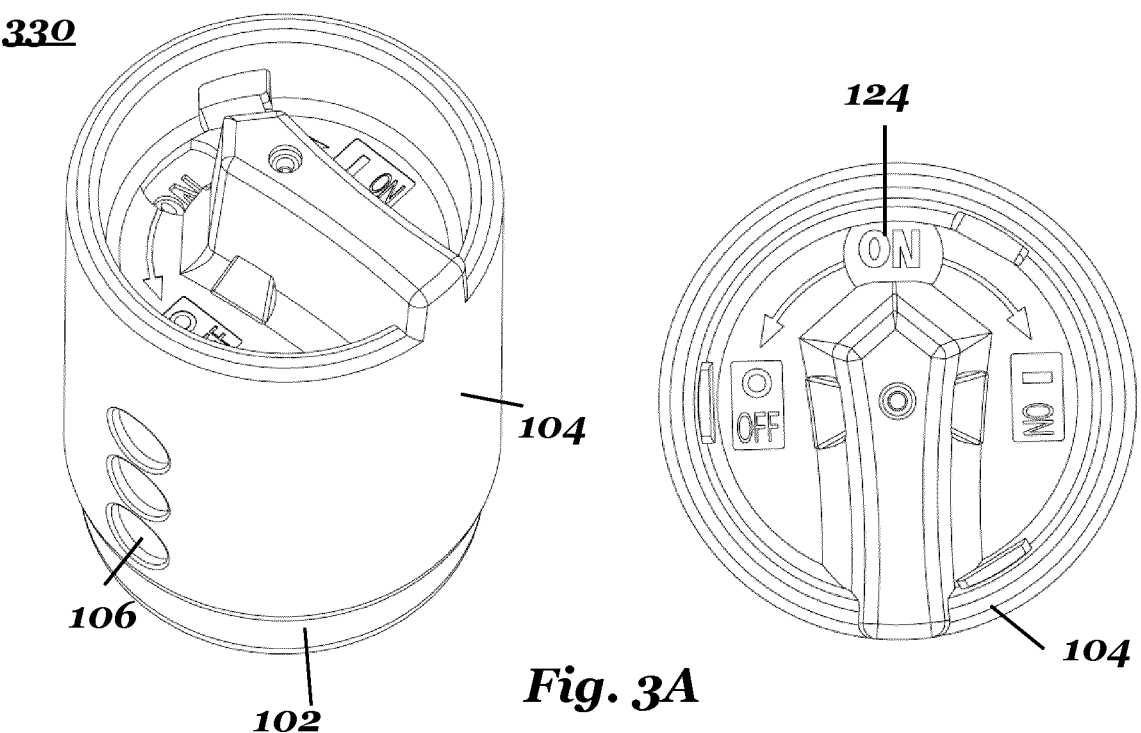
FIGS. 3A to 3D are isometric views illustrating four relative positions of first and second housing components of a housing of an isolating switch according to a first group of embodiments.
Figure 4A:
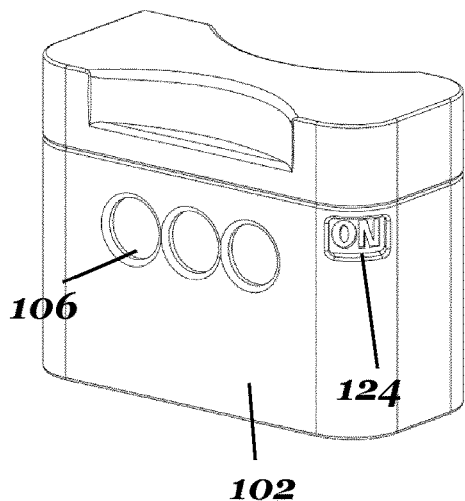
FIGS. 4A to 4D are isometric views illustrating four relative positions of first and second housing components of a housing of an isolating switch according to a second group of embodiments.
Figure 4A:
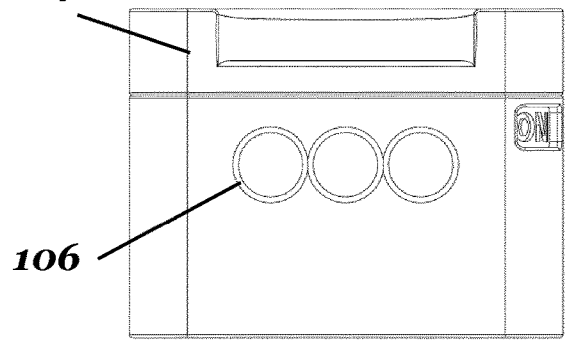

In FIGS. 3A and 4A, second housing component 104 is in a first position 330 relative to first housing component 102. In the first position 330, switching mechanism 112 is in the closed position and circuit 118 is closed. Components connected to the circuit 118, such as a battery, are live. This arrangement can be communicated to a user in a simple and easy manner by symbol 124. In other words, symbol 124 is representative, or is a visual representation, of the current relative position of the first and second housing components. The at least one test point 110 is covered by the second housing component 104—in other words, the at least one aperture 106 does not align with the at least one test point 110 and the at least one test point 110 is not exposed.

Figure 3B:
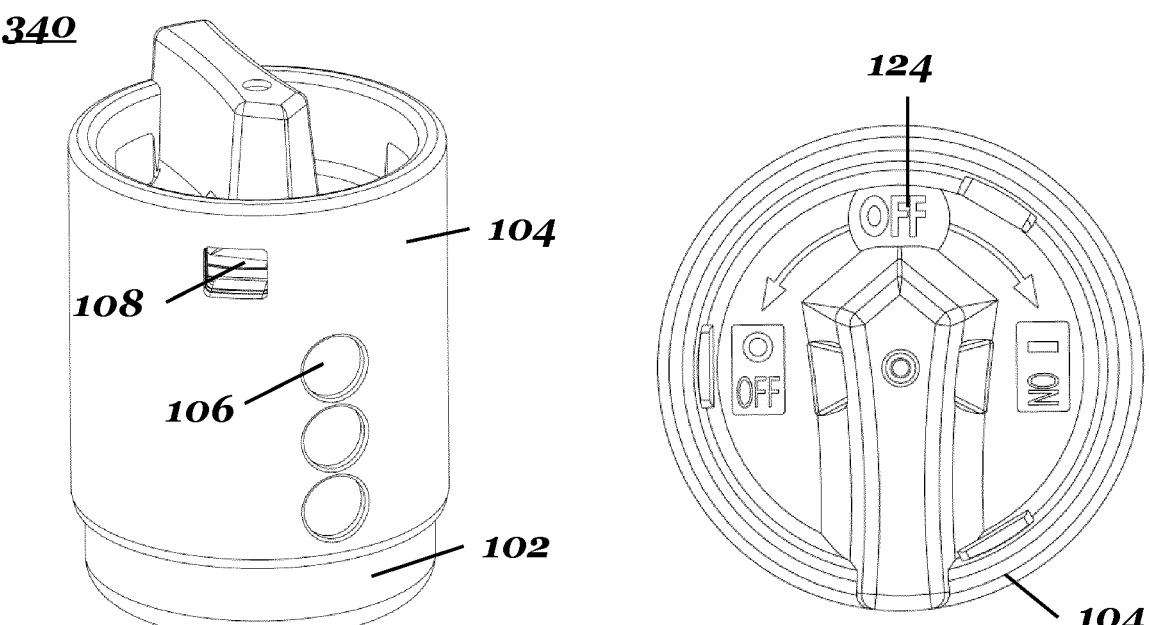
Figure 4B:
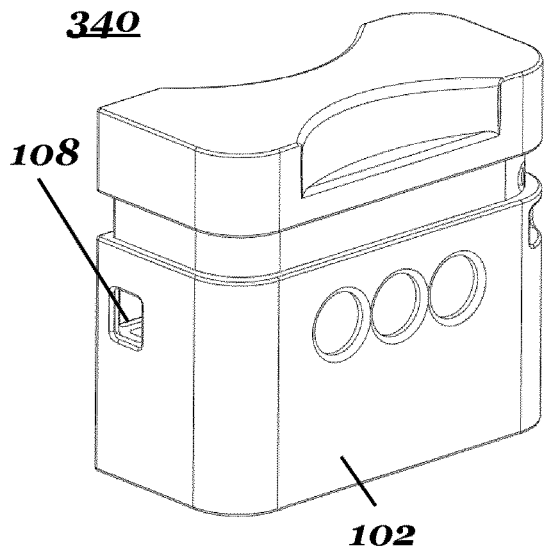
Figure 4B:
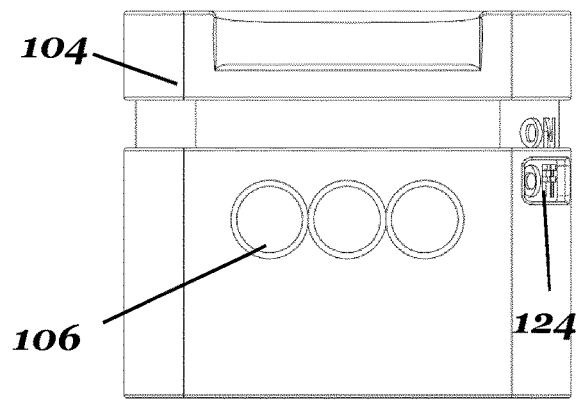

In FIGS. 3B and 4B, second housing component 104 is in a second position 340 relative to the first housing component 102. In the second relative position 340, switching mechanism 112 is in the open position and circuit 118 is open. Components connected to the circuit 118, such as a battery, are not live (i.e. no current is running through them). Again, this relative position can be communicated to a user with symbol 124. As with the first relative position 330, the at least one test point 110 is covered by the second housing component 104—in other words, the at least one aperture 106 does not align with the at least one test point 110 and the at least one test point 110 is not exposed.

In the second relative position 340, openings 108 in the first and second housing components 102, 104 are aligned such that a locking mechanism can be applied to the isolating switch 100. To achieve this, the openings 108 are advantageously suitable for receiving a shackle or pin of the locking mechanism. The locking mechanism can prevent the second housing component being moved relative to the first housing component in order that the isolating switch 100 can be 'locked off'. Alternatively, any other suitable means of locking can be applied instead of, or as well as, openings 108.

Locking the isolating switch off when it is in an open position can prevent accidental movement of the switching mechanism to a closed position (i.e. a position where the circuit is live) whilst servicing is being conducted. The openings 108 therefore represent an advantageous safety feature which can prevent a user being exposed to live, potentially high current, components accidentally.

Figure 3C:
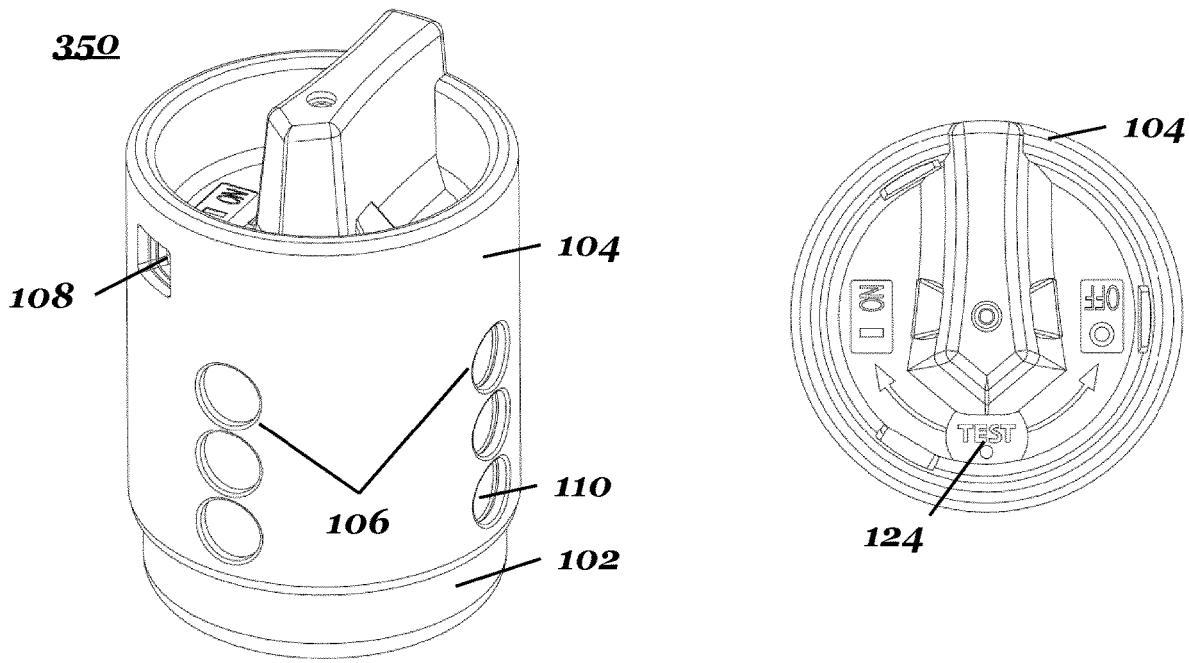
Figure 4C:
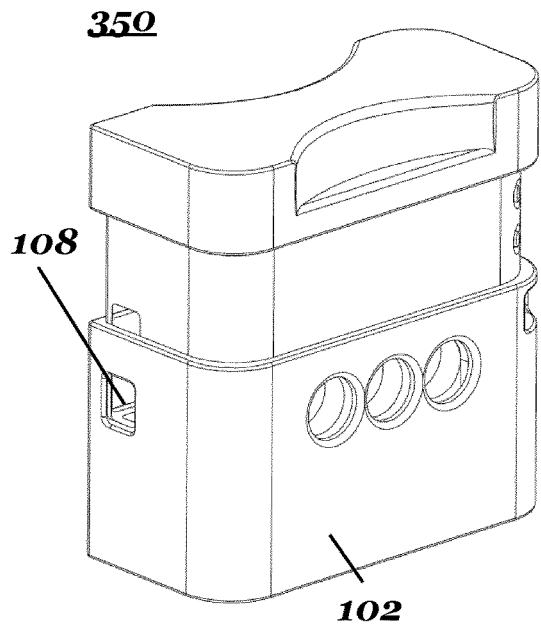
Figure 4C:
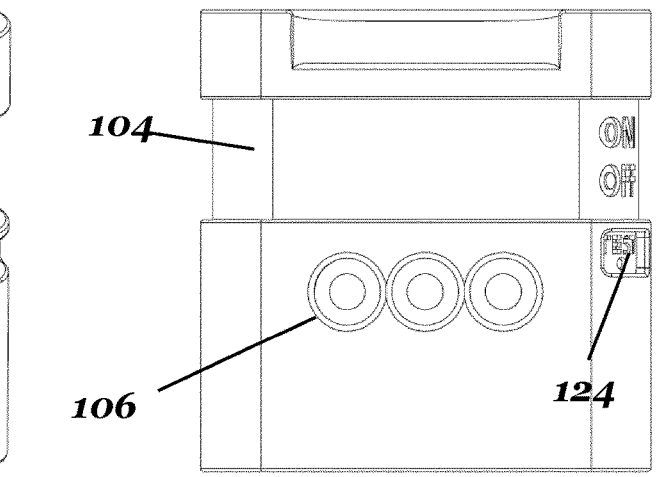

In FIGS. 3C and 4C, second housing component 104 is in a third position 350 relative to the first housing component 102. In the third relative position 350, switching mechanism 112 is in the open position and circuit 118 is open. Components connected to the circuit 118, such as a battery, are not live (i.e. no power is running through them). However, in contrast to the second relative position 340, the at least one test point 110 is exposed through the at least one aperture 106. In FIG. 3C, the at least one test point 110 is arranged in the first housing component 102 and the at least one aperture 106 is arranged in the second housing component 104; the at least one aperture overlaps with, or aligns with, the at least one test point 110 in order to expose said test point(s). In FIG. 4C, the at least one test point 110 is arranged in the second housing component 104 and the at least one aperture 106 is arranged in the first housing component 102; the at least one aperture overlaps with, or aligns with, the at least one test point 110 in order to expose said test point(s).

As with the second relative position 340, in this third relative position 350 openings 108, provided in the first and second housing components 102, 104, are aligned such that a locking mechanism can be applied to the isolating switch 100. This locking mechanism can prevent the second housing component being moved relative to the first housing component and thereby can facilitate locking off of the isolating switch 100. It will be understood that the openings 108 may be arranged such that the isolating switch 100 can be locked off in only one of the second and third relative positions (i.e. not both). For example, the openings 108 may be arranged such that the isolating switch 100 can only be locked off when the at least one test point is exposed (i.e. in the third relative position 350), in order that the user servicing a device incorporating the isolating switch is not at risk of being exposed to live electrics whilst using the at least one test point 110.

Figure 3D:
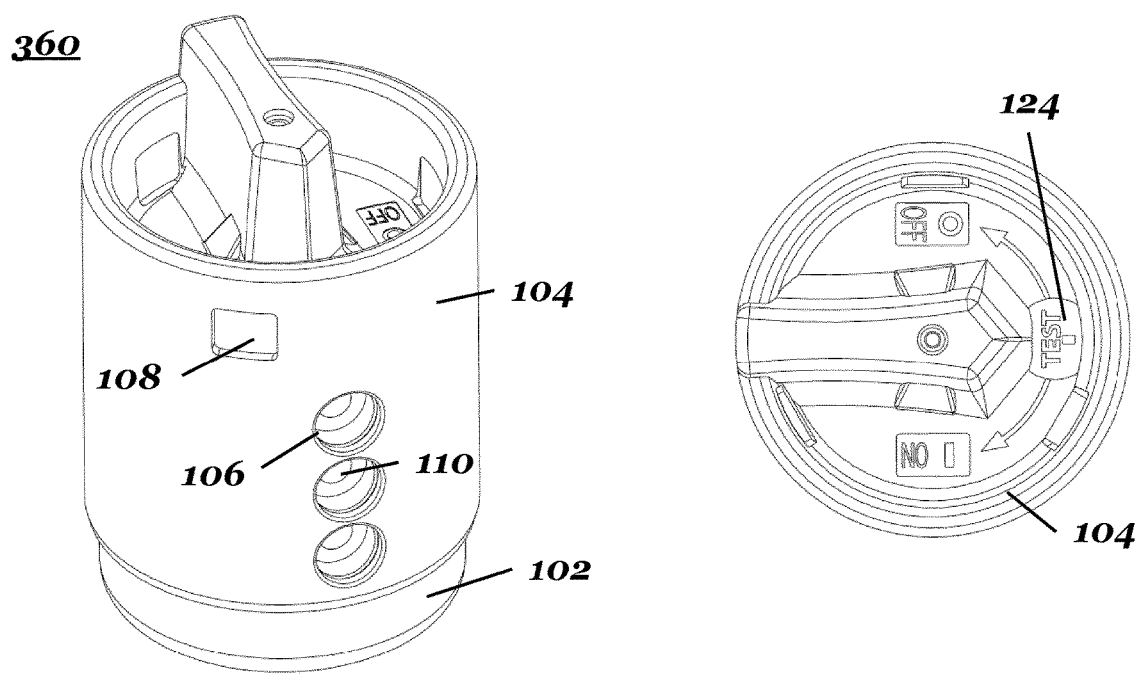
Figure 4D:
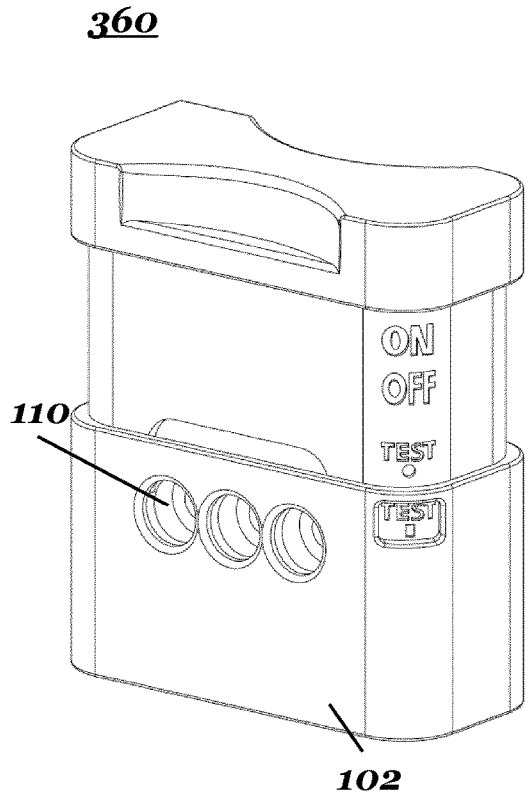
Figure 4D:
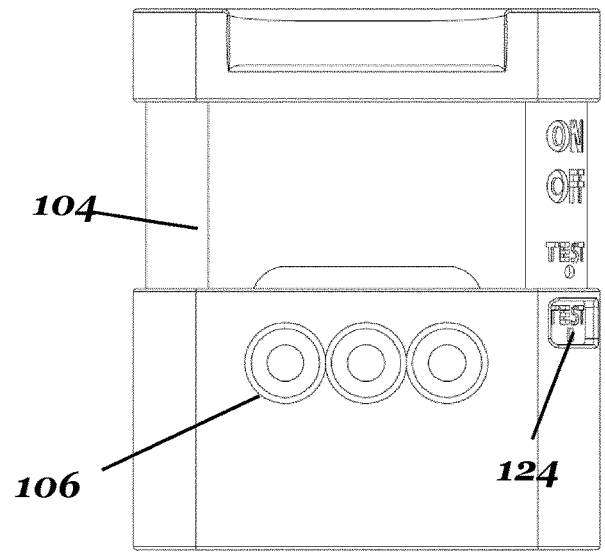

In FIGS. 3D and 4D, second housing component 104 is in a fourth position 360 relative to the first housing component 102. In the fourth relative position 360, switching mechanism 112 is in the closed position and circuit 118 is closed. Components connected to the circuit 118, such as a battery, are live (i.e. current is running through them), as in the first relative position 330. However, in contrast to the first relative position 330, the at least one test point 110 is exposed through the at least one aperture 106. In FIG. 3D, the at least one test point 110 is arranged in the first housing component 102 and the at least one aperture 106 is arranged in the second housing component 104; the at least one aperture overlaps with, or aligns with, the at least one test point 110 in order to expose said test point(s). In FIG. 4D, the at least one test point 110 is arranged in the second housing component 104 and the at least one aperture 106 is arranged in the first housing component 102; the at least one aperture overlaps with, or aligns with, the at least one test point 110 in order to expose said test point(s).

In FIG. 3D, opening 108 in second housing component 104 does not overlap with a corresponding opening in the first housing component 102, and thus no locking mechanism can be applied in the arrangement shown. However, it will be understood that, although not illustrated, openings 108 in the first and second housing components 180, 104 can be aligned in one or both of the first and fourth relative positions in order to lock the isolating switch in a closed position. This may be additionally or alternatively to locking the isolating switch in an open position, as described above with respect to the second and third relative positions. Alternatively, any other suitable means for locking can be applied instead of, or as well as, openings 108.

Any of the feature(s) described with reference to the first group of embodiments can, where not inconsistent, be combined with any feature(s) described with reference to the second group of embodiments.

More generally, the isolating switch of the first aspect is suitable for use with any circuits involved in energy storage applications, such as HVIL, a power wall or grid level storage, or machine building and panel builder applications. The switching mechanism can be any suitable switching mechanism for opening and closing a circuit. The switching mechanism may comprise resilient members, as described above, but any other suitable form of switching mechanism may be used. The switching mechanism can have any suitable number of poles or throws, provided the desired functionality (of opening and closing the circuit where the at least one test point is not exposed, and at least one of opening and closing the circuit where the at least one test point is exposed) is achieved. For example, the switching mechanism can be a one-way switch (single pole, single throw), a two-way switch (single pole, double throw), a double pole switch (double pole, single throw), or any other suitable switch architecture. Actuation of said switching mechanism can be linear, rotary, or any other suitable method of actuation.

More generally, the first housing component encloses and is coupled to the switching mechanism and the second housing component is coupled to the switching mechanism and movable with respect to the first housing component such that relative movement of the first and second housing components operates the switching mechanism. It will be understood that both the first and second housing components can be moved in order to operate the switching mechanism, or only one of the first and second housing components can be moved in order to operate the switching mechanism.

In other words, the first and second housing components should be arranged such that both housing components are coupled to the switching mechanism in such a way that movement of one housing component with respect to the other opens and closes the circuit. This movement can be rotational or linear, as described above with reference to the first and second groups of embodiments, or any other suitable relative movement of the housing components.

Advantageously, the first and second housing components are formed of an electrically insulating material, for example plastic, which can reduce the risk of electrocution of a user.

Alternatively, the housing may be formed of any other suitable material, for example aluminium, which can reduce the weight of the switch compared to some other materials.

More generally, the at least one aperture can comprise one aperture, two apertures, three apertures (as illustrated above with respect to the first and second groups of embodiments), or more than three apertures. The housing may further comprise a cover which covers the at least one aperture and needs to be opened or removed in order to expose the at least one test point through the at least one aperture. The at least one test point is electrically connected to the circuit, i.e. is electrically connected to one or more components forming the circuit. This arrangement can facilitate testing of said component(s). The at least one test point can comprise any suitable number of test points, i.e. one test point, two test points, three test points (as illustrated above with respect to the first and second groups of embodiments), or more than three test points. There may be the same number of aperture as test points, or a different number. For example, three test points may be exposed through a single aperture or through three smaller apertures.

Figure 5:
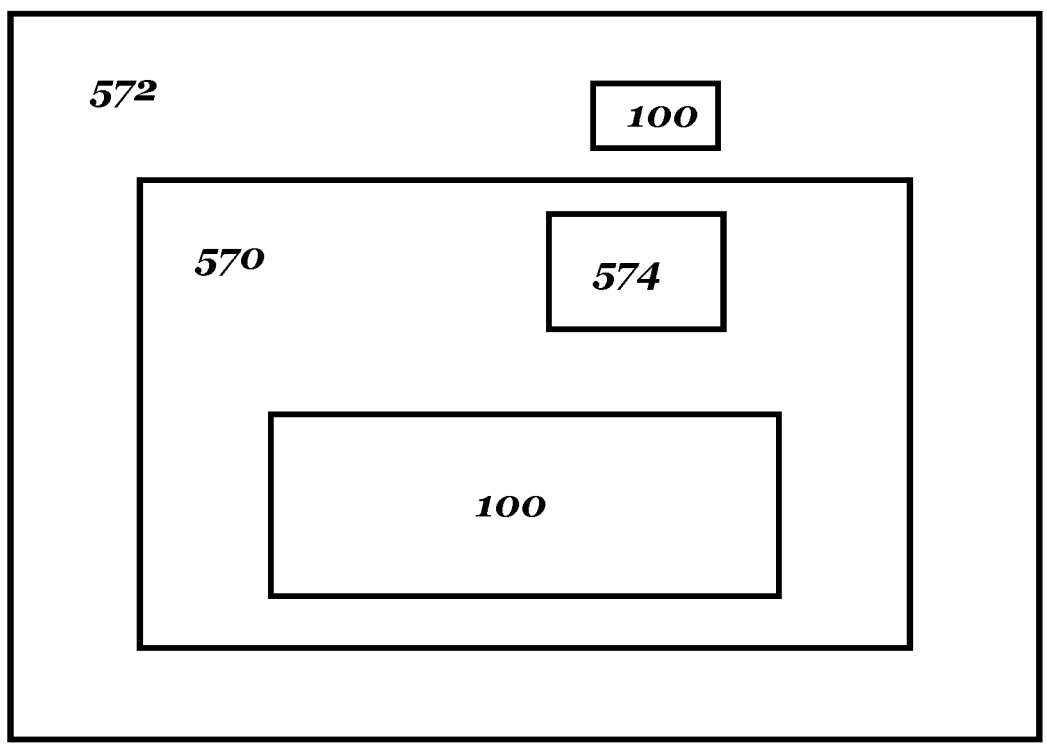
FIG. 5 illustrates a vehicle comprising an isolating switch and a powertrain according to embodiments.

With reference to FIG. 5, a powertrain 570 comprising isolating switch 100 is described. In particular, powertrain 570 can be a powertrain for an electric vehicle 572. In regard to a vehicle (e.g. a motor vehicle, a ship or boat, or a plane, etc.), a powertrain encompasses the main components that generate power and deliver it to the road surface, water, or air. This includes the engine, transmission, drive shafts, and the drive wheels (or other drive mechanism, such as a propeller).

In an electric or hybrid vehicle, the powertrain 570 also includes battery 574 and an electric motor, for example. For example, the powertrain 570 comprises a high voltage interlock loop (HVIL) (the low-voltage circuit which runs through the high voltage components of the electric/hybrid vehicle but is separate to the high voltage circuit which supplies power to the battery and other powertrain components) and the isolating switch 100, where battery 574 is indirectly connected to the HVIL circuit (such that breaking of the HVIL breaks the high voltage circuit which supplies power to the battery and isolates the battery). In this arrangement, when the second housing component is in the first or the fourth relative positions, the battery 574 is live, and when the second housing component is in the second or the third relative positions, the battery 574 is not live.

Alternatively, electric vehicle 572 can comprise isolating switch 100 in the absence of powertrain 570, as illustrated in FIG. 5.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An isolating switch for a circuit, comprising:
a switching mechanism movable between an open position in which the circuit is open and a closed position in which the circuit is closed; and
a housing, comprising:
a first housing component coupled to and enclosing the switching mechanism;
a second housing component coupled to the switching mechanism and movable with respect to the first housing component to move the switching mechanism between the open position and the closed position;
at least one aperture arranged in one of the first or second housing components; and
at least one test point electrically connected to the circuit and arranged in an other of the first or second housing components,
wherein the second housing component is movable with respect to the first housing component between at least:
a first relative position in which the switching mechanism is in the closed position and the at least one test point is not exposed through the at least one aperture,
a second relative position in which the switching mechanism is in the open position and the at least one test point is not exposed through the at least one aperture, and
a third relative position in which the switching mechanism is in either the closed position or the open position and the at least one test point is exposed through the at least one aperture.

2. The isolating switch of claim 1, wherein the second housing component is movable with respect to the first housing component between four relative positions, and
wherein in the third relative position the switching mechanism is in the open position and the at least one test point is exposed through the at least one aperture and in a fourth relative position the switching mechanism is in the closed position and the at least one test point is exposed through the at least one aperture.

3. The isolating switch of claim 2, wherein the at least one test point exposed in the third relative position is a same at least one test point exposed in the fourth relative position.

4. The isolating switch of claim 2, wherein the at least one test point exposed in the third relative position is a different at least one test point to the at least one test point exposed in the fourth relative position.

5. The isolating switch of claim 1, wherein the second housing component is movable in a linear direction with respect to the first housing component.

6. The isolating switch of claim 5, wherein the switching mechanism comprises a linear switch.

7. The isolating switch of claim 1, wherein the second housing component is rotatable with respect to the first housing component.

8. The isolating switch of claim 7, wherein the switching mechanism comprises a rotary cam switch.

9. The isolating switch of claim 1, wherein the at least one aperture is arranged in the second housing component and the at least one test point is arranged in the first housing component.

10. The isolating switch of claim 1, wherein the at least one aperture is arranged in the first housing component and the at least one test point is arranged in the second housing component.

11. The isolating switch of claim 1, wherein the first and second housing components each comprise at least one opening arranged such that, when the switching mechanism is in the open position, an opening of the first housing component and an opening of the second housing overlap, the openings being configured to receive a shackle or pin of a locking mechanism.

12. The isolating switch of claim 1, wherein the isolating switch comprises an isolating switch for a high voltage interlock loop (HVIL) circuit of an electric vehicle.

13. A powertrain for an electric vehicle, comprising:
the isolating switch of claim 12.

14. An electric vehicle, comprising:
the isolating switch of claim 12;
the HVIL circuit; and
a battery pack,
wherein when the second housing component is in the first or the fourth relative positions, the battery pack is live, and
wherein when the second housing component is in the second or the third relative positions, the battery pack is not live.

15. A method, comprising:
operating the isolating switch of claim 1.

* * * * *